US009668219B2

(12) United States Patent
Kim et al.

(10) Patent No.: US 9,668,219 B2
(45) Date of Patent: May 30, 2017

(54) POWER REDUCTION METHOD FOR MULTI-PATH RECEIVER INCLUDING MULTI-RECEIVERS AND THE MULTI-PATH RECEIVER

(71) Applicants: SAMSUNG ELECTRONICS CO., LTD., Suwon-si (KR); POSTECH ACADEMY-INDUSTRY FOUNDATION, Pohang-si (KR)

(72) Inventors: Jong Han Kim, Suwon-si (KR); Young Geun Choi, Pohang-si (KR); Sung Joo Yoo, Pohang-si (KR); Joon Seong Kang, Suwon-si (KR); Young Jun Hong, Seoul (KR)

(73) Assignees: Samsung Electronics Co., Ltd., Suwon-si (KR); Postech Academy—Industry Foundation, Pohang-si (KR)

( * ) Notice: Subject to any disclaimer, the term of this patent is extended or adjusted under 35 U.S.C. 154(b) by 272 days.

(21) Appl. No.: 14/015,049

(22) Filed: Aug. 30, 2013

(65) Prior Publication Data

US 2014/0140252 A1    May 22, 2014

(30) Foreign Application Priority Data

Nov. 22, 2012  (KR) .......................... 10-2012-0132713

(51) Int. Cl.
*H04W 52/02* (2009.01)

(52) U.S. Cl.
CPC ..... *H04W 52/028* (2013.01); *H04W 52/0287* (2013.01); *Y02B 60/50* (2013.01)

(58) Field of Classification Search
None
See application file for complete search history.

(56) References Cited

U.S. PATENT DOCUMENTS

| 5,390,357 | A | 2/1995 | Nobusawa et al. |
| 5,566,364 | A * | 10/1996 | Mizoguchi et al. .......... 455/132 |
| 2004/0106441 | A1* | 6/2004 | Kazakevich et al. ......... 455/574 |
| 2005/0197080 | A1* | 9/2005 | Ulupinar et al. ............. 455/135 |
| 2007/0116160 | A1* | 5/2007 | Eisenhut ............. H04W 52/028 375/345 |
| 2007/0117523 | A1 | 5/2007 | Weber et al. |
| 2009/0180413 | A1* | 7/2009 | Sutton .......................... 370/311 |
| 2010/0150278 | A1* | 6/2010 | Lee ..................... H04W 52/028 375/340 |
| 2010/0202493 | A1 | 8/2010 | Soliman et al. |
| 2012/0149424 | A1* | 6/2012 | Dawid et al. ................. 455/522 |
| 2012/0287815 | A1* | 11/2012 | Attar ............................. 370/253 |
| 2013/0156080 | A1* | 6/2013 | Cheng .................... H01Q 1/243 375/222 |

(Continued)

FOREIGN PATENT DOCUMENTS

| JP | 07-311254 A | 11/1995 |
| JP | 10-336066 A | 12/1998 |
| JP | 2006-108771 A | 4/2006 |

(Continued)

*Primary Examiner* — Robert M Morlan
(74) *Attorney, Agent, or Firm* — NSIP Law (57) ABSTRACT

A power reduction method for a multi-path receiver including multi-receivers, includes detecting a state of the multi-receivers, and controlling clock gating or power gating of the multi-receivers based on the state.

18 Claims, 8 Drawing Sheets

(56) References Cited

U.S. PATENT DOCUMENTS

2013/0244665 A1* 9/2013 Clevorn et al. ............... 455/437

FOREIGN PATENT DOCUMENTS

| JP | 2007-158515 A | 6/2007 |
| JP | 2010-10854 A | 1/2010 |
| JP | 2011-40847 A | 2/2011 |
| JP | 2012-151879 A | 8/2012 |

* cited by examiner

POWER REDUCTION METHOD FOR MULTI-PATH RECEIVER INCLUDING MULTI-RECEIVERS AND THE MULTI-PATH RECEIVER

CROSS-REFERENCE TO RELATED APPLICATION

This application claims the benefit under 35 USC 119(a) of Korean Patent Application No. 10-2012-0132713, filed on Nov. 22, 2012, in the Korean Intellectual Property Office, the entire disclosure of which is incorporated herein by reference for all purposes.

BACKGROUND

1. Field

The following description relates to a power reduction method for a multi-path receiver including multi-receivers and the multi-path receiver.

2. Description of Related Art

Use of a sensor network has expanded due to a rapid development of wireless network technology and commercialization. As a result of contributions from activities of the Institute of Electrical and Electronics Engineers (IEEE), technological standardization has been implemented for communication technologies such as Bluetooth, IEEE 802.15.4g, and ZigBee.

A size of sensors in various wireless sensor networks and a local area network (LAN) is small, and thus, meeting requirements of use over a long period of time, of low power, and of low complexity may be needed to operate multiple sensors. In particular, in a multi-path receiver, power may be unnecessarily consumed since synchronization is performed for all paths until a synchronization of a single path is matched.

SUMMARY

In one general aspect, there is provided a power reduction method for a multi-path receiver including multi-receivers, the method including detecting a state of the multi-receivers, and controlling clock gating or power gating of the multi-receivers based on the state.

In another general aspect, there is provided a multi-path receiver for power reduction, the multi-path receiver including multi-receivers configured to receive a signal. The multi-path receiver further includes a detecting unit configured to detect a state of the multi-receivers, and a control unit configured to control clock gating or power gating of the multi-receivers based on the state.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
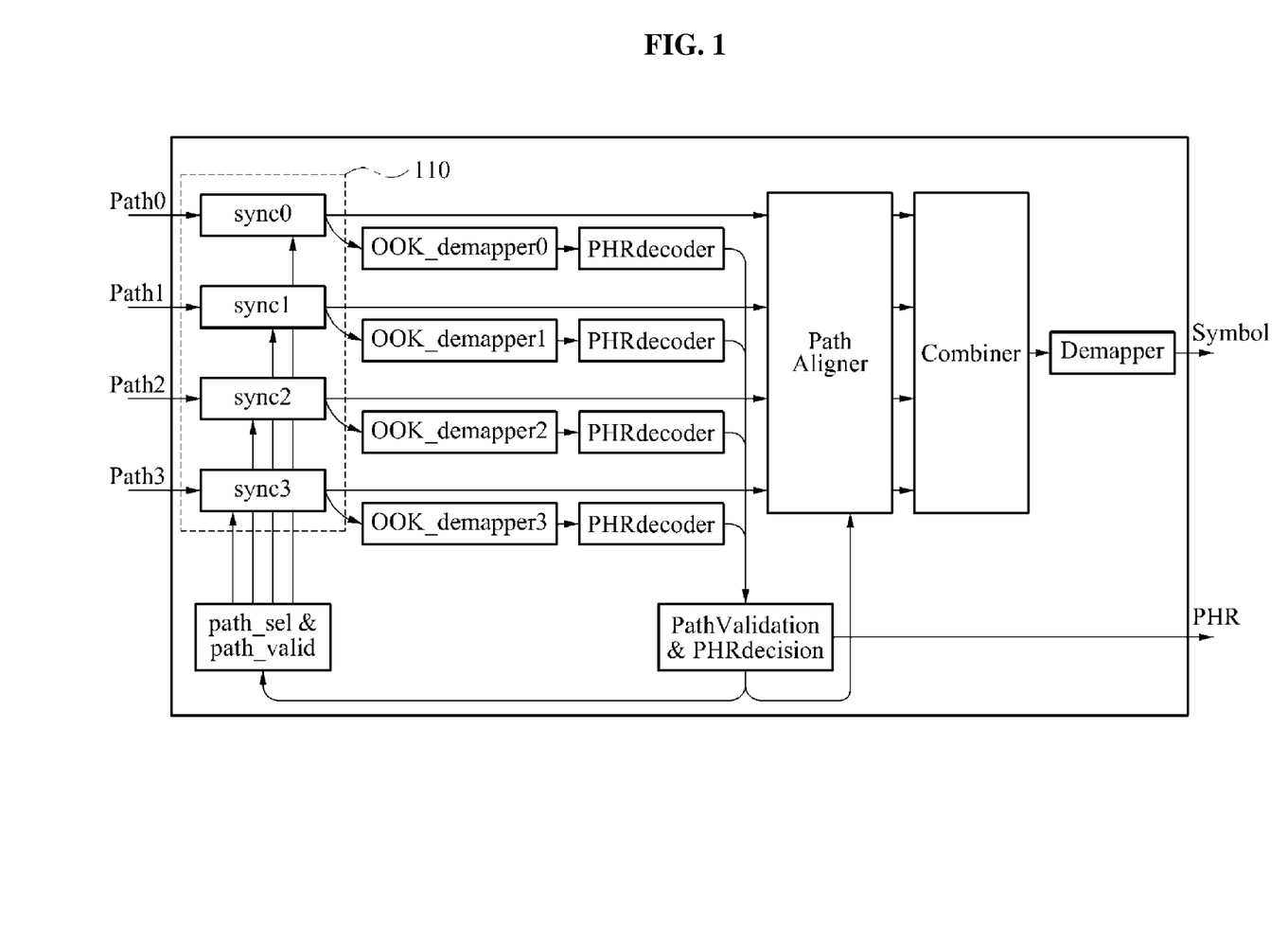
FIG. 1 is a diagram illustrating an example of a multi-path receiver.

FIG. 1 illustrates an example of a multi-path receiver. Referring to FIG. 1, the multi-path receiver includes multi-receivers 110, for example, sync0, sync1, sync2, and sync3. The multi-receivers 110 refer to receivers that receive data via multi-paths, for example, Path0, Path1, Path2, and Path3, respectively. Each of the multi-receivers 110 further includes a synchronization tracking circuit that performs tracking in a sync state.

Since the multi-receivers 110 are scattered, power consumed in the synchronization tracking circuit of each of the multi-receivers 110 may account for a total of about 40% of operational power of the multi-path receiver. Transitively, when a synchronization of one or a portion of the multi-paths is near completion, power consumed in a synchronization tracking process of the corresponding synchronization tracking circuit may be reduced by suspending a synchronization of a total number of or a portion of any remaining multi-paths. A synchronization may be detected or tracked from each of the multi-receivers 110, and a reference value and an application range may be adjusted. For example, a number of the multi-receivers 110 to suspend to reduce an amount of the power consumed may be adjusted based on a property of communication channels.

The multi-receivers 110 may be synchronized. Each of the multi-receiver 110 may transfer a signal to a subsequent path validation and a physical layer header (PHR) decision block to validate a multi-path of a corresponding receiver. Other components of the multi-path receiver (e.g., demapper and PHR decoder blocks) are known to one of ordinary skill in the art, so description of such components is omitted for conciseness.

When multiple paths used to receive a signal exist as in the multi-path receiver, an amount of power consumed in multi-receivers 110 may be large. To reduce the amount of the power consumed, clock gating or power gating may be controlled. Clock gating may include controlling, for example, cutting-off, a gate that provides a clock signal to a block unused in a digital synchronization circuit. For example, if a camera module is unused, power consumed in a corresponding unused central processing unit (CPU) block may be prevented by cutting-off provision of a clock signal to the CPU block. Power gating may include cutting-off provision of power, for example, Vdd, to a block unused in a digital synchronization circuit.

Figure 2:
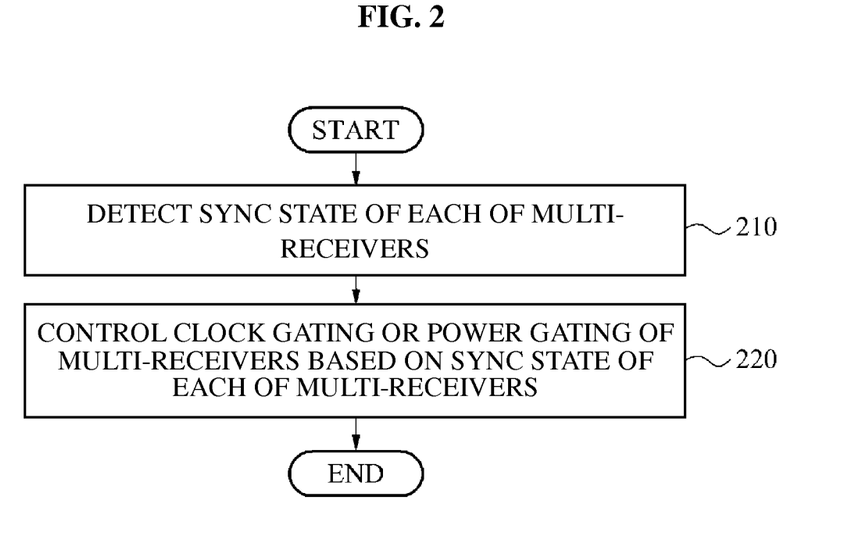
FIG. 2 is a flowchart illustrating an example of a power reduction method for a multi-path receiver.

FIG. 2 illustrates an example of a power reduction method for a multi-path receiver. Referring to FIG. 2, in operation 210, the multi-path receiver including multi-receivers detects a sync state of each of the multi-receivers. The multi-path receiver may detect the sync state of each of the multi-receivers based on a synchronization tracking circuit included in the corresponding multi-receiver. The sync state may refer to an operation state of a multi-receiver that is tracked by the synchronization tracking circuit and that matches a synchronization of the multi-receivers.

In more detail, the multi-path receiver may detect the sync state of each of the multi-receivers based on a strength of a signal received at the corresponding multi-receiver, and/or a timing of the signal received at the corresponding multi-receiver. For example, when the strength of the signal received at the corresponding multi-receiver is a predetermined value, or the signal is maintained for a predetermined duration of time, the multi-path receiver may detect the sync state of the corresponding multi-receiver.

In operation 220, the multi-path receiver controls clock gating or power gating of the multi-receivers based on the sync state of each of the multi-receivers. In more detail, the multi-path receiver may compare the sync state of each of the multi-receivers to a predetermined reference value, and based on a result of the comparison, select, from among the multi-receivers, at least one multi-receiver to which a clock signal or power is to be cut off. For example, the multi-path receiver may select, from among the multi-receivers, the multi-receiver to which the clock signal or power is to be cut off based on whether the sync state of any of the multi-receivers is greater than or equal to the predetermined reference value. When the sync state of any of the multi-receivers is greater than or equal to the predetermined reference value, the multi-path receiver may select, from among the multi-receivers, the multi-receiver in a lowest sync state to which the clock signal or power is to be cut off. If a number of the multi-receivers in the lowest sync state is greater than or equal to two, the multi-path receiver may select, from among the multi-receivers in the lowest sync state, the multi-receiver to which a clock signal or power is to be cut off based on a predetermined priority of each of multi-receivers in the lowest sync state.

Figure 3:
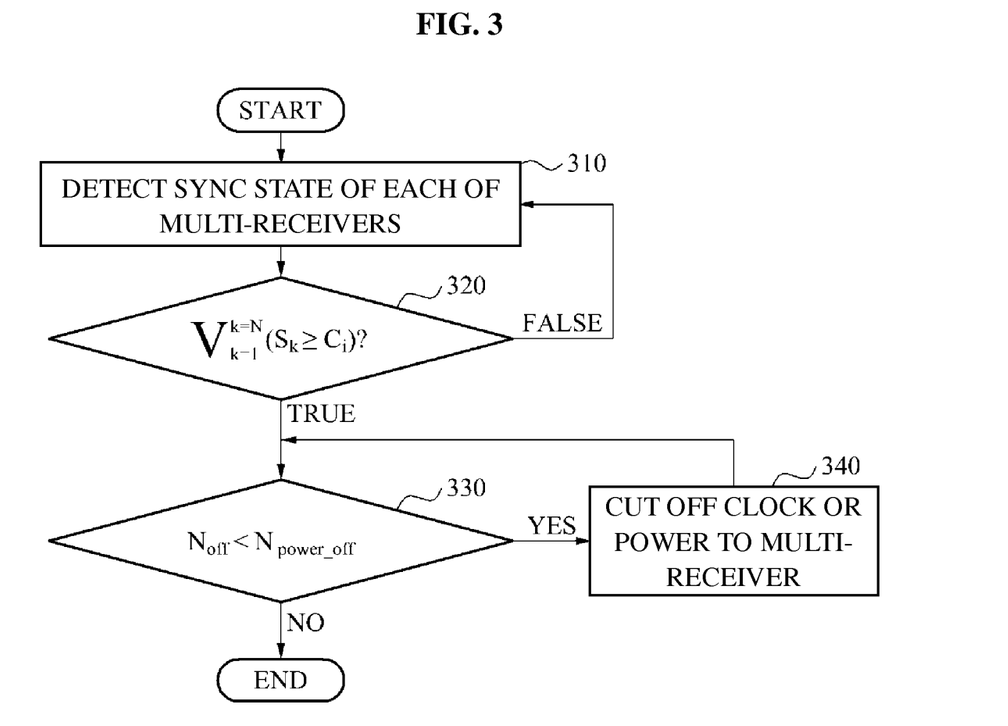
FIG. 3 is a flowchart illustrating another example of a power reduction method for a multi-path receiver.

FIG. 3 illustrates another example of a power reduction method for a multi-path receiver. Referring to FIG. 3, in operation 310, a multi-path receiver including multi-receivers detects a sync state of each of the multi-receivers based on a synchronization tracking circuit included in the corresponding multi-receiver.

The multi-path receiver compares the sync state of each of the multi-receivers to a predetermined reference value. For example, in operation 320, the multi-path receiver determines whether the sync state of any of the multi-receivers satisfies the following example of Equation 1:

$$V_{k=1}^{k=N}(S_k \geq C_i) \quad (1)$$

In Equation 1, $V_{k=1}^{k=N}$ denotes a logic "OR" operation when k is equal to a value in a range of 1 to N, $S_k$ denotes a sync state of a k-th multi-receiver, and $C_i$ denotes the predetermined reference value.

In more detail, for all values of k, the multi-path receiver determines whether the sync state $S_k$ of the k-th multi-receiver is greater than or equal to the predetermined reference value $C_i$. The multi-path receiver may adjust the predetermined reference value $C_i$ based on a property of communication channels in which the multi-receivers receive a signal. If the sync state of each of the multi-receivers is determined to be less than the predetermined reference value, the method returns to operation 310, and the multi-path receiver repeats the detection of the sync state of each of the multi-receivers. Otherwise, the method continues in operation 330.

In operation 330, the multi-path receiver determines whether a number $N_{off}$ of the multi-receivers to which a clock signal or power is cut off is less than a number $N_{power\_off}$ of the multi-receivers to which the clock signal or power is to be cut off. The number $N_{power\_off}$ of the multi-receivers to which the clock signal or power is to be cut off may be a predetermined number, for example, as represented in the example of Table 1. If the number $N_{off}$ of the multi-receivers to which the clock signal or power is cut off is determined to be less than the number $N_{power\_off}$ of the multi-receivers to which the clock signal or power is to be cut off, the method continues in operation 340. Otherwise, the method ends.

In operation 340, the multi-path receiver cuts off the clock signal or power to a multi-receiver in a lowest sync state. The method returns to operation 330, and the multi-path receiver repeats the determination of whether the number $N_{off}$ of the multi-receivers to which the clock signal or power is cut off is less than the number $N_{power\_off}$ of the multi-receivers to which the clock signal or power is to be cut off.

In more detail, if a number of the multi-receivers in the lowest sync state is greater than or equal to two, the multi-path receiver may select, from among the multi-receivers in the lowest sync state, at least one multi-receiver to which the clock signal or power is to be cut off based on a predetermined priority of each of the multi-receivers in the lowest sync state. The multi-path receiver may further adjust the number $N_{power\_off}$ of the multi-receivers to which the clock signal or power is to be cut off, and the predetermined reference value, based on a property of communication channels of the multi-receivers.

For example, the multi-path receiver may set or adjust the number $N_{power\_off}$ of the multi-receivers to which the clock signal or power is to be cut off, and the reference value $C_i$, based on a relative magnitude of noise in the communication channels of the multi-receivers as shown in Table 1. By adjusting such values, the multi-path receiver may adjust a point in time at which clock gating or power gating of the multi-receivers is performed.

TABLE 1

| Noise Level | $N_{power\_off}$ | $C_i$ |
| --- | --- | --- |
| L | 3 | C0 |
| M | 2 | C1 |
| H | 0 | C2 |

In Table 1, the relative magnitude of the noise in the communication channels in which the multi-receivers receive a signal is divided into three noise levels, for example, high (H), medium (M), and low (L). A method of adjusting, by a multi-path receiver, a number of multi-receivers to which a clock signal or power is to be cut off, and a predetermined reference value, based on a relative magnitude of noise in communication channels will be described with reference to FIGS. 5 to 7.

Figure 4:
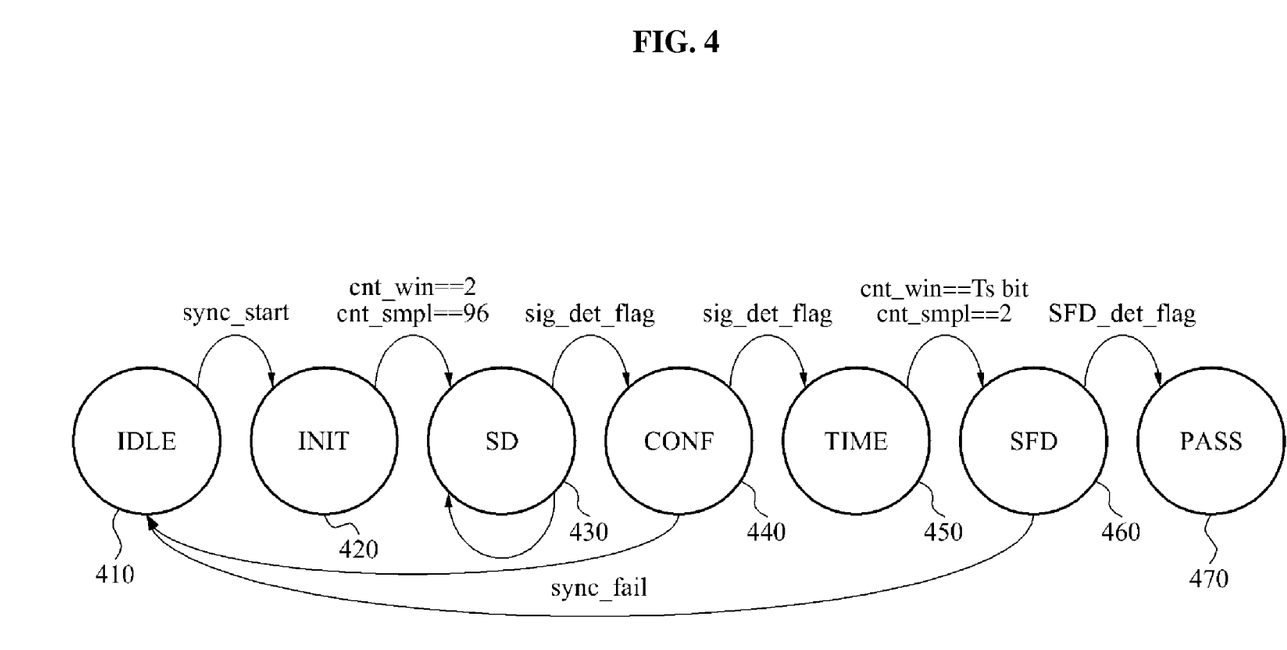
FIG. 4 is a state diagram illustrating an example of an inner operation of a multi-receiver.

FIG. 4 illustrates an example of an inner operation of a multi-receiver. A synchronization tracking circuit included in the multi-receiver operates as shown in FIG. 4, and an operation for each of states is performed as follows.

When the multi-path receiver is initialized, the synchronization tracking circuit is in an IDLE state 410.

When a "sync_start" signal is received, the synchronization tracking circuit enters an initial (INIT) state 420. In the INIT state 420, the synchronization tracking circuit estimates an initial noise level in communication channels of the multi-receivers, and records a value of 1 or 0 in a shift register based on the estimated initial noise level.

When a signal indicating that a window size (cnt_win) is 2, and that a number (cnt_smpl) of samples included in windows is 96, is received, the synchronization tracking circuit enters a signal detection (SD) state 430. If the window size increases, an overhead may increase, and if the window size is small, an effect of noise may be great. Therefore, the window size may be properly selected based on an effect resulting from varying window sizes.

In the SD state 430, the synchronization tracking circuit in the SD state 430 estimates a noise level and a signal level, being a signal magnitude, in the communication channels, and detects a signal through the estimation. In more detail, the synchronization tracking circuit detects a desired signal from among signals in which only noise exists. For example, the synchronization tracking circuit may compare a correlation between 96 samples in 2 windows, respectively, to verify an existence of the signal. Alternatively, the synchronization tracking circuit may add values of the respective 96 samples in the 2 windows and verify the existence of the signal if the added values are greater than a predetermined value. When the desired signal is received or detected, the synchronization tracking circuit sets a flag to generate a "sig_det_flag" signal that notifies the reception or detection of the desired signal.

When the "sig_det_flag" signal is generated, the synchronization tracking circuit enters a confirmation (CONF) state 440. In the CONF state 440, the synchronization tracking circuit confirms whether the desired signal is detected properly from among the signals in which only the noise exists. When the desired signal is confirmed to be detected properly, the synchronization tracking circuit maintains the flag to generate the "sig_det_flag" signal. Otherwise, the synchronization tracking circuit resets the flag, and returns to the IDLE state 410.

When "sig_det_flag" signal is maintained, the synchronization tracking circuit enters a TIME state 450. In the TIME state 450, the synchronization tracking circuit performs a time synchronization, for example, a chip synchronization. For example, if information about a single sample "1" is represented in three bits "111" rather than a single bit, corresponding information may be recognized as "1" by a value of the remaining two bits although a value of a received signal is less than a predetermined level, such as "101" or "011" due to noise. In this example, one of the three bits indicating the information about the single sample "1" may be a chip. In the TIME state 450, a detection in a sample unit may be performed.

When a signal indicating that the window size (cnt_win) is Ts bit, and that the number (cnt_smpl) of the samples included in the windows is 2, the synchronization tracking circuit enters a start frame delimiter (SFD) state 460. In the SFD state 460, the synchronization tracking circuit performs a frame synchronization and a mean-variance estimation.

The mean-variance estimation may be performed by using a variable of a probability density function based on a normal distribution, and a statistical estimation and prediction may be made possible when the normal distribution is known. When a frame is synchronized to include a start point, the synchronization tracking circuit sets a flag to generate a "SFD_det_flag" signal that refers to the start point of the frame. When the frame synchronization fails (sync_fail), the synchronization tracking circuit resets the flag used to generate the "SFD_det_flag" signal, and returns to the IDLE state 410.

When the "SFD_det_flag" signal is generated, the synchronization tracking circuit enters a PASS state 470. In the PASS state 470, the synchronization tracking circuit may delay Analog to Digital Converter (ADC) data input, and transfer the delayed ADC data input to a subsequent block.

Figure 5:
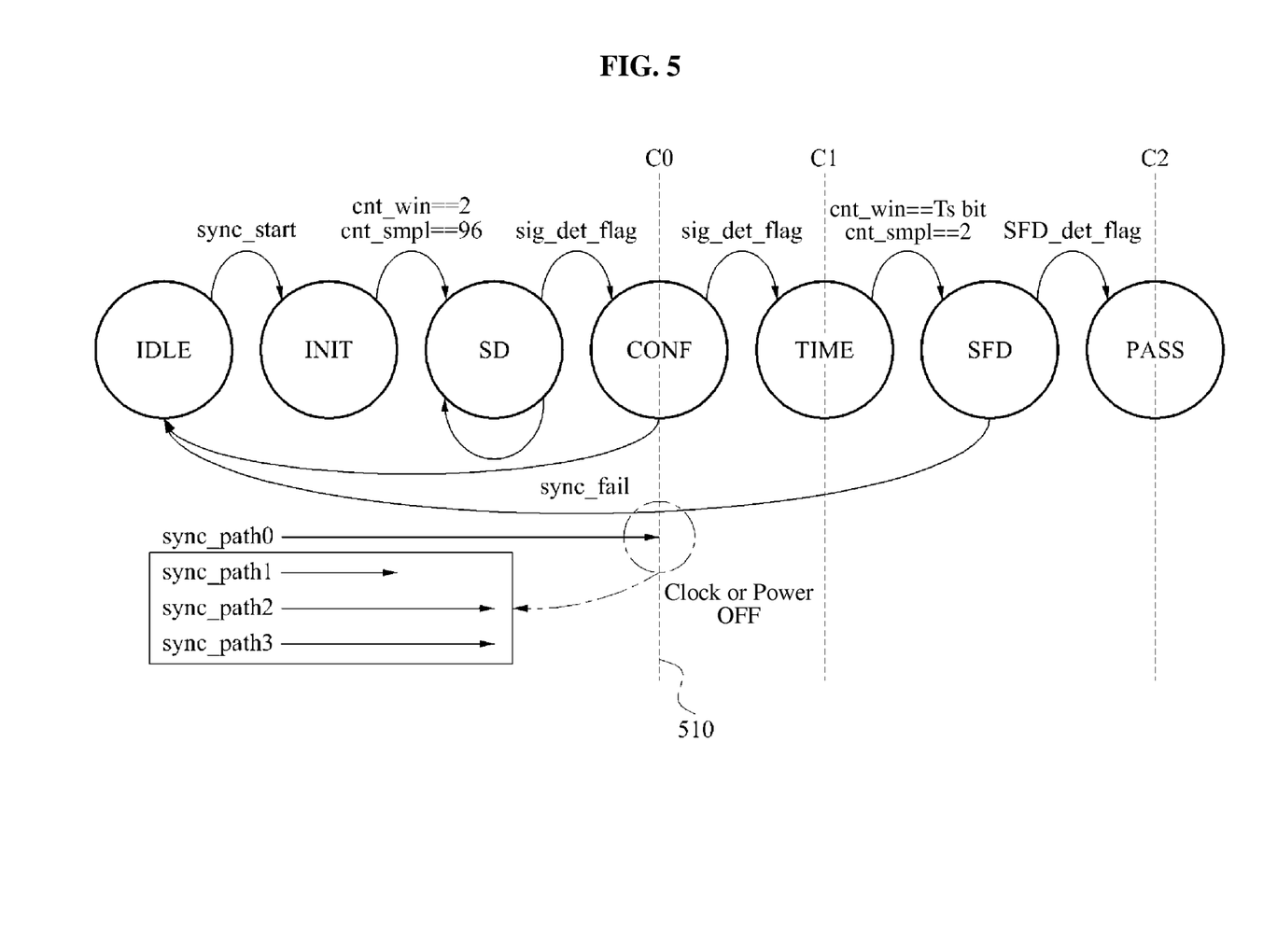
FIG. 5 is a state diagram illustrating an example of an inner operation of each of multi-receivers when a noise level is low in communication channels.
Figure 6:
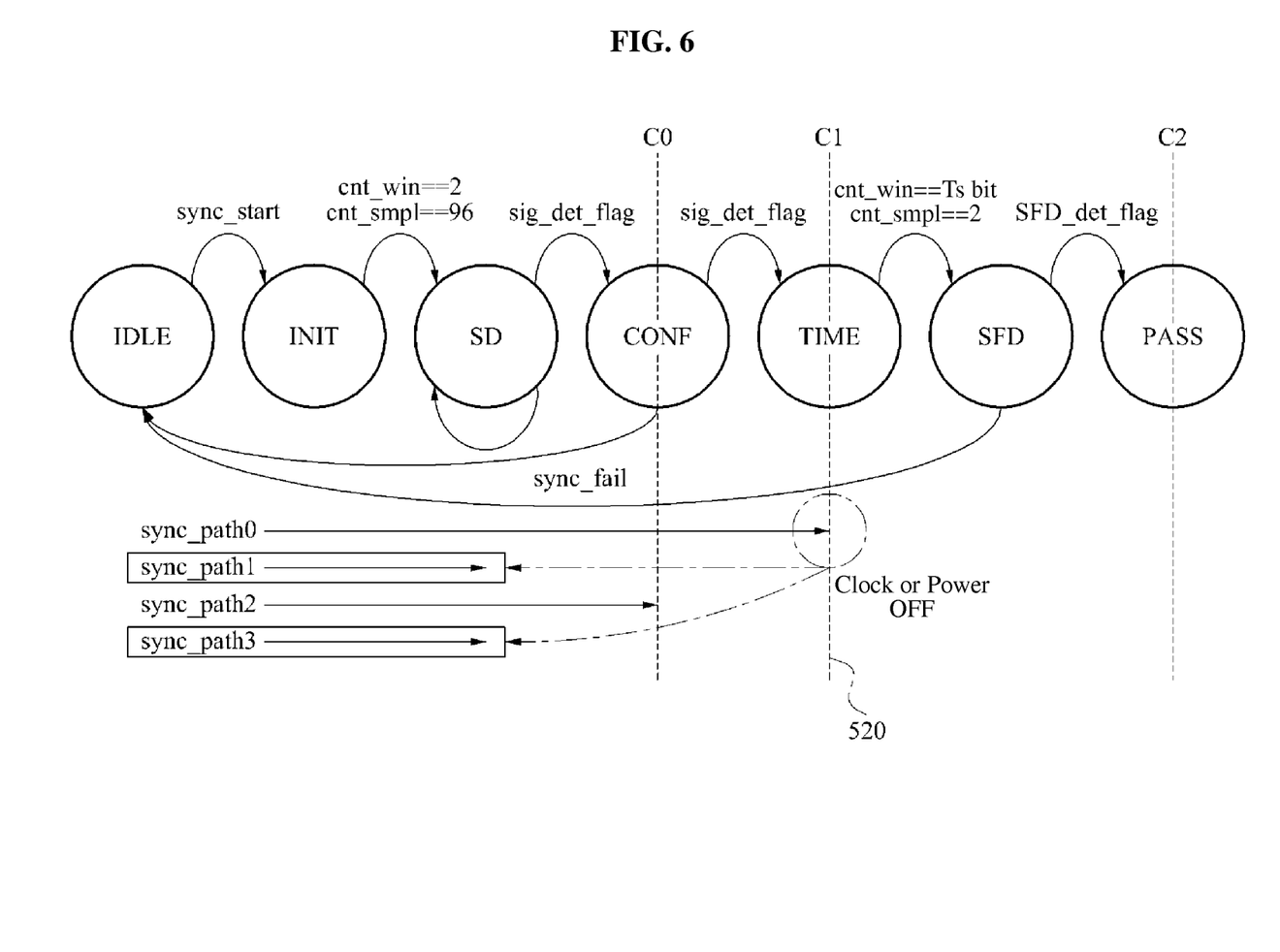
FIG. 6 is a state diagram illustrating an example of an inner operation of each of multi-receivers when a noise level is medium in communication channels.
Figure 7:
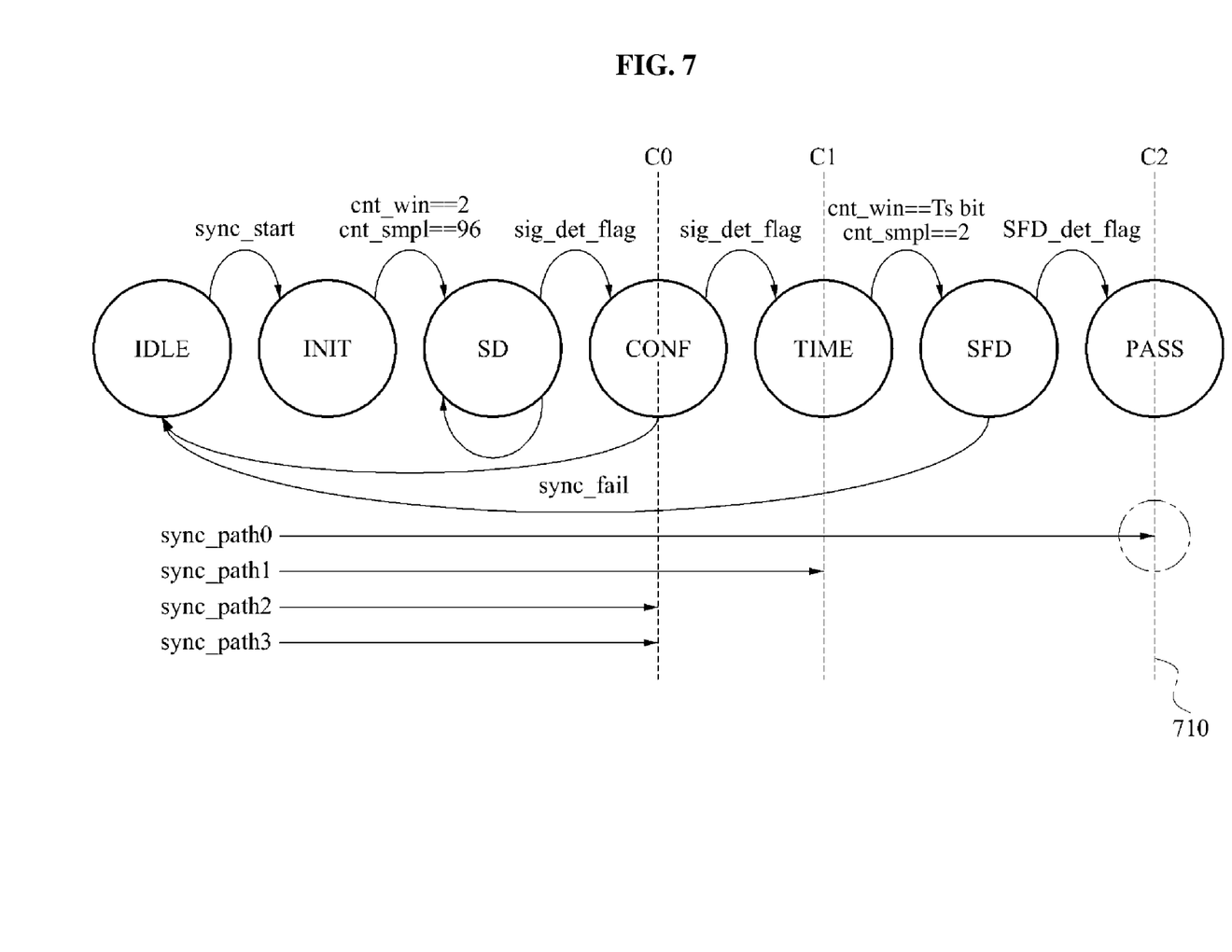
FIG. 7 is a state diagram illustrating an example of an inner operation of each of multi-receivers when a noise level is high in communication channels.

When a signal is received in a multi-path receiver including multi-receivers, a multi-receiver selected by a "path_sel" signal in FIG. 1 may be activated, and operate as shown in state diagrams in FIGS. 5 to 7. Referring to FIGS. 5 to 7, when a sync state (value) of the multi-receiver is greater than or equal to a predetermined reference value, for example, C0, C1, or C2, the multi-path receiver may cut off a clock signal or power to an entirety of or a portion of the multi-receivers. As discussed above, a reference value $C_i$ and a number $N_{power\_off}$ of the multi-receivers to which the clock signal or power is to be cut off may be adjusted based on a property of communication channels, for example, a relative magnitude of noise in the communication channels, of the multi-receivers.

Reducing an amount of power consumed in the multi-path receiver is possible since an active portion of the multi-receivers may be reduced in a short time in an operation of the synchronization tracking circuit occupying a considerable amount of power consumed. However, when the number $N_{power\_off}$ of the multi-receivers to which the clock signal or power is to be cut off, and the reference value $C_i$, are set aggressively to a great extent, information about a corresponding frame may be lost. In this example, a risk of additional power consumed and performance degradation may increase since a synchronization may be re-performed in a subsequent frame. Accordingly, packet loss may be minimized and an amount of power consumed may be reduced by properly setting the reference value $C_i$ and the number $N_{power\_off}$ of the multi-receivers to which the clock signal or power is to be cut off based on the property of the communication channels. Hereinafter, an method of adjusting, by the multi-path receiver, the reference value $C_i$ and the number $N_{power\_off}$ of the multi-receivers to which the clock signal or the power is to be cut off based on the relative magnitude of the noise will be described with reference to FIGS. 5 to 7.

FIG. 5 illustrates an example of an inner operation of each of multi-receivers sync_path0, sync_path1, sync_path2, and sync_path3 when a noise level is low in communication channels. Referring to FIG. 5, a relative magnitude of noise is low in the communication channels of the multi-receivers, a number $N_{power\_off}$ of the multi-receivers to which a clock signal or power is to be cut off is three, and a predetermined reference value $C_i$ is C0 510. The predetermined reference value C0 510 refers to the CONF state 440 of FIG. 4.

Referring again to FIG. 5, a sync state of the multi-receiver sync_path0 reaches the predetermined reference value C0 510. Since the number $N_{power\_off}$ of the multi-receivers to be cut off is three, a multi-path receiver may reduce power consumed by cutting off the clock signal or power to the remaining three multi-receivers sync_path1, sync_path2, and sync_path3.

FIG. 6 illustrates an example of an inner operation of each of multi-receivers sync_path0, sync_path1, sync_path2, and sync_path3 when a noise level is medium in communication channels. Referring to FIG. 6, when a relative magnitude of noise is medium in the communication channels of the multi-receivers, a number $N_{power\_off}$ of the multi-receivers to which a clock signal or power is to be cut off is two, and a predetermined reference value $C_i$ is C1 520. The predetermined reference value C1 520 refers to the TIME state 450 of FIG. 4.

Referring again to FIG. 6, a sync state of the multi-receiver sync_path0 reaches the predetermined reference value C1 520. Since the number $N_{power\_off}$ of the multi-receivers to be cut off is two, a multi-path receiver may reduce power consumed by cutting off the clock signal or power to two of the multi-receivers, e.g., sync_path1 and sync_path3.

That is, when the sync state of one of the multi-receivers (e.g., sync_path0) reaches the predetermined reference value C1 520, two of the multi-receivers (e.g., sync_path1 and sync_path3), each of which is in a respective sync state that is less than the reference value C1 520, or in a lowest sync state, may be selected to be cut off from the clock signal or power. When a number of the multi-receivers in the lowest sync state is greater than two, and a portion of the multi-receivers is to be selected to be cut off, the portion of the multi-receivers to be cut off may be selected based on a predetermined priority of each of the multi-receivers in the lowest sync state. For example, the predetermined priority may be a priority value of a corresponding multi-receiver. Accordingly, the multi-receiver sync_path3 in the lowest sync state (e.g., the SD state) and including a higher priority value than that of the multi-receiver sync_path1 in the lowest sync state, may take precedence in being cut off.

FIG. 7 illustrates an example of an inner operation of each of multi-receivers sync_path0, sync_path1, sync_path2, and sync_path3 when a noise level is high in communication channels. Referring to FIG. 7, when a relative magnitude of noise is high in the communication channels of the multi-receivers, a number $N_{power\_off}$ of the multi-receivers to which a clock signal or power is to be cut off is zero, and a predetermined reference value $C_i$ is C2 710. The predetermined reference value C2 710 refers to the PASS state 470 of FIG. 4.

Referring again to FIG. 7, a sync state of the multi-receiver sync_path0 reaches the reference value C2 710. Since the number $N_{power\_off}$ of the multi-receivers to be cut off is zero, a multi-path receiver may not cut off the clock signal or power to any of the multi-receivers.

Figure 8:
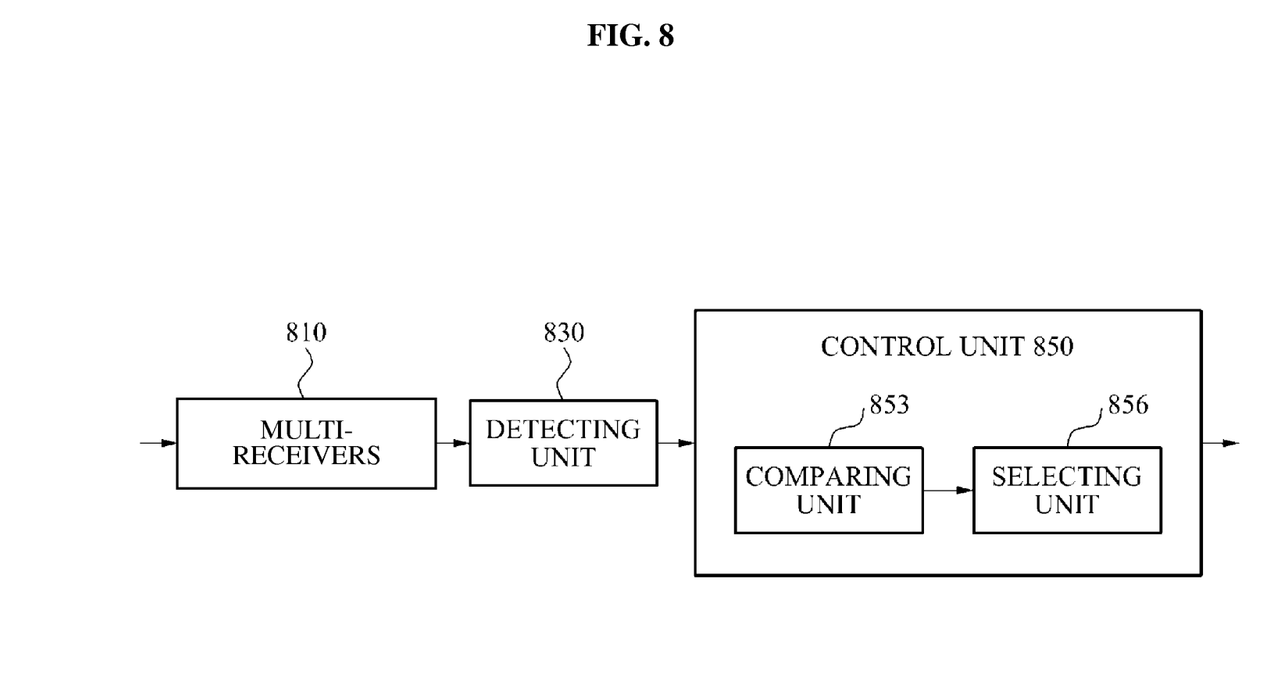
FIG. 8 is a block diagram illustrating an example of a multi-path receiver.

FIG. 8 illustrates an example of a multi-path receiver. Referring to FIG. 8, the multi-path receiver includes multi-receivers 810, a detecting unit 830, and a control unit 850. The control unit 850 includes a comparing unit 853 and a selecting unit 856.

The multi-receivers 810 receive a signal. The detecting unit 830 detects a sync state of each of the multi-receivers 810. The detecting unit 830 may detect the sync state of each of the multi-receivers 810 based on a strength and/or a timing of the received signal.

The control unit 850 controls clock gating or power gating of the multi-receivers 810 based on the sync state of each of the multi-receivers 810. In more detail, the comparing unit 853 compares the sync state of each of the multi-receivers 810 to a predetermined reference value. The selecting unit 856 selects, from among the multi-receivers 810, at least one multi-receiver to which a clock signal or power is to be cut off based on a result of the comparison. The selecting unit 856 may select, from among the multi-receivers 810, the multi-receiver to which the clock signal or power is to be cut off based on whether the sync state of any of the multi-receivers 810 is greater than or equal to the predetermined reference value. When the sync state of any of the multi-receivers 810 is greater than or equal to the predetermined reference value, the selecting unit 856 may select, from among the multi-receivers 810, the multi-receiver in a lowest sync state to which the clock signal or power is to be cut off. If a number of the multi-receivers 810 in the lowest sync state is greater than or equal to two, the selecting unit 856 may select, from among the multi-receivers 810 in the lowest sync state, the at multi-receiver to which the clock signal or power is to be cut off based on a predetermined priority of each of the multi-receivers 810 in the lowest sync state.

The control unit 850 cuts off the clock signal or power to the selected multi-receiver. The control unit 850 may adjust the number of the multi-receivers 810 to be cut off from the clock signal or power, and/or the predetermined reference value, based on a property of communication channels of the multi-receivers 810.

The various units, modules, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power reduction method for a multi-path receiver comprising multi-receivers, the method comprising:
   detecting a state of each of the multi-receivers; and
   controlling clock gating or power gating of each of the multi-receivers based on the state,
   wherein the state comprises an operation to be performed in a process of establishing synchronization,
   wherein the controlling cut off a clock signal or power supplied to a multi-receiver having a lowest state by controlling the clock gating or power gating.

2. The method of claim 1, wherein the detecting comprises:
   detecting the state based on a strength and/or a timing of a signal.

3. The method of claim 1, wherein the controlling comprises:
   comparing the state to a reference value;
   selecting, from the multi-receivers, the multi-receiver having the lowest state to which the clock signal or power is to be cut off based on the comparing; and
   cutting off the clock signal or power to the multi-receiver.

4. The method of claim 3, wherein the selecting comprises:
   selecting, from the multi-receivers, the multi-receiver to which the clock signal or power is to be cut off based on whether the state is greater than or equal to the reference value.

5. The method of claim 3, wherein the selecting comprises:
   selecting, from the multi-receivers, the multi-receiver to which the clock signal or power is to be cut off based on a priority value of each of the multi-receivers in a lowest state in response to a number of the multi-receivers having the lowest state being greater than or equal to two.

6. The method of claim 3, further comprising:
   adjusting a number of the multi-receivers to which the clock signal or power is to be cut off based on a property of communication channels of the multi-receivers.

7. The method of claim 6, wherein the property comprises a relative magnitude of noise.

8. The method of claim 3, further comprising:
adjusting the reference value based on a property of communication channels of the multi-receivers,
wherein the reference value indicates another operation in the process of establishing synchronization.

9. The method of claim 8, wherein the property comprises a relative magnitude of noise.

10. The method of claim 1, further comprising:
tracking the state.

11. A non-transitory computer-readable storage medium storing a program comprising instructions to cause a computer to perform the method of claim 1.

12. A multi-path receiver for power reduction, the multi-path receiver comprising:
multi-receivers configured to receive a signal;
a detector configured to detect a state of each of the multi-receivers; and
a controller configured to control clock gating or power gating of each of the multi-receivers based on the state,
wherein the state comprises an operation to be performed in a process of establishing synchronization,
wherein the controller configured to cut off a clock signal or power supplied to a multi-receiver having a lowest state by controlling the clock gating or power gating.

13. The multi-path receiver of claim 12, wherein the detector is further configured to:
detect the state based on a strength and/or a timing of the signal.

14. The multi-path receiver of claim 12, wherein the controller comprises:
a comparer configured to compare the state to a reference value; and
a selector configured to select, from the multi-receivers, the multi-receiver having the lowest state to which the clock signal or power is to be cut off based on a result of the comparison,
wherein the controller is further configured to cut off the clock signal or power to the multi-receiver.

15. The multi-path receiver of claim 14, wherein the selector is further configured to:
select, from the multi-receivers, the multi-receiver to which the clock signal or power is to be cut off based on whether the state is greater than or equal to the reference value.

16. The multi-path receiver of claim 14, wherein the selector is further configured to:
select, from the multi-receivers, the multi-receiver to which the clock signal or power is to be cut off based on a priority value of each of the multi-receivers in a lowest state in response to a number of the multi-receivers having the lowest state being greater than or equal to two.

17. The multi-path receiver of claim 14, wherein the controller is further configured to:
adjust a number of the multi-receivers to which the clock signal or power is to be cut off based on a property of communication channels of the multi-receivers.

18. The multi-path receiver of claim 14, wherein the controller is further configured to:
adjust the reference value based on a property of communication channels of the multi-receivers,
wherein the reference value indicates another operation in the process of establishing synchronization.

* * * * *